United States Patent [19]

Frank

[11] 3,992,181

[45] Nov. 16, 1976

[54] SHAPING GLASS SHEETS

[75] Inventor: Robert G. Frank, Murrysville, Pa.

[73] Assignee: PPG Industries, Inc., Pittsburgh, Pa.

[22] Filed: June 2, 1975

[21] Appl. No.: 583,332

[52] U.S. Cl. .................................. 65/104; 65/106; 65/245; 65/253; 65/273; 65/286
[51] Int. Cl.² ........................................ C03B 23/02
[58] Field of Search ............ 65/104, 106, 245, 253, 65/273, 275, 286

[56] References Cited
UNITED STATES PATENTS

| | | | |
|---|---|---|---|
| 3,497,340 | 2/1970 | Dennison et al. ...................... | 65/104 |
| 3,545,951 | 12/1970 | Nedelec ................................ | 65/104 |

Primary Examiner—Arthur D. Kellogg
Attorney, Agent, or Firm—Dennis G. Millman; Edward I. Mates

[57] ABSTRACT

In the roll forming method of shaping glass sheets, glass defects are reduced by employing a mild stream of cooling gas in the vicinity of the lower forming rolls and/or the underside of the glass sheet.

During continuing mass production runs at high rates of production extending over long periods, the heated glass sheets heat the surfaces of the lower rotating forming rolls to a significantly higher temperature than that of the upper rotating forming rolls. The present invention reduces the detrimental effects that have been determined by the present invention to be due to this temperature differential between the surface temperature of the upper forming rolls and that of the lower forming rolls.

10 Claims, 4 Drawing Figures

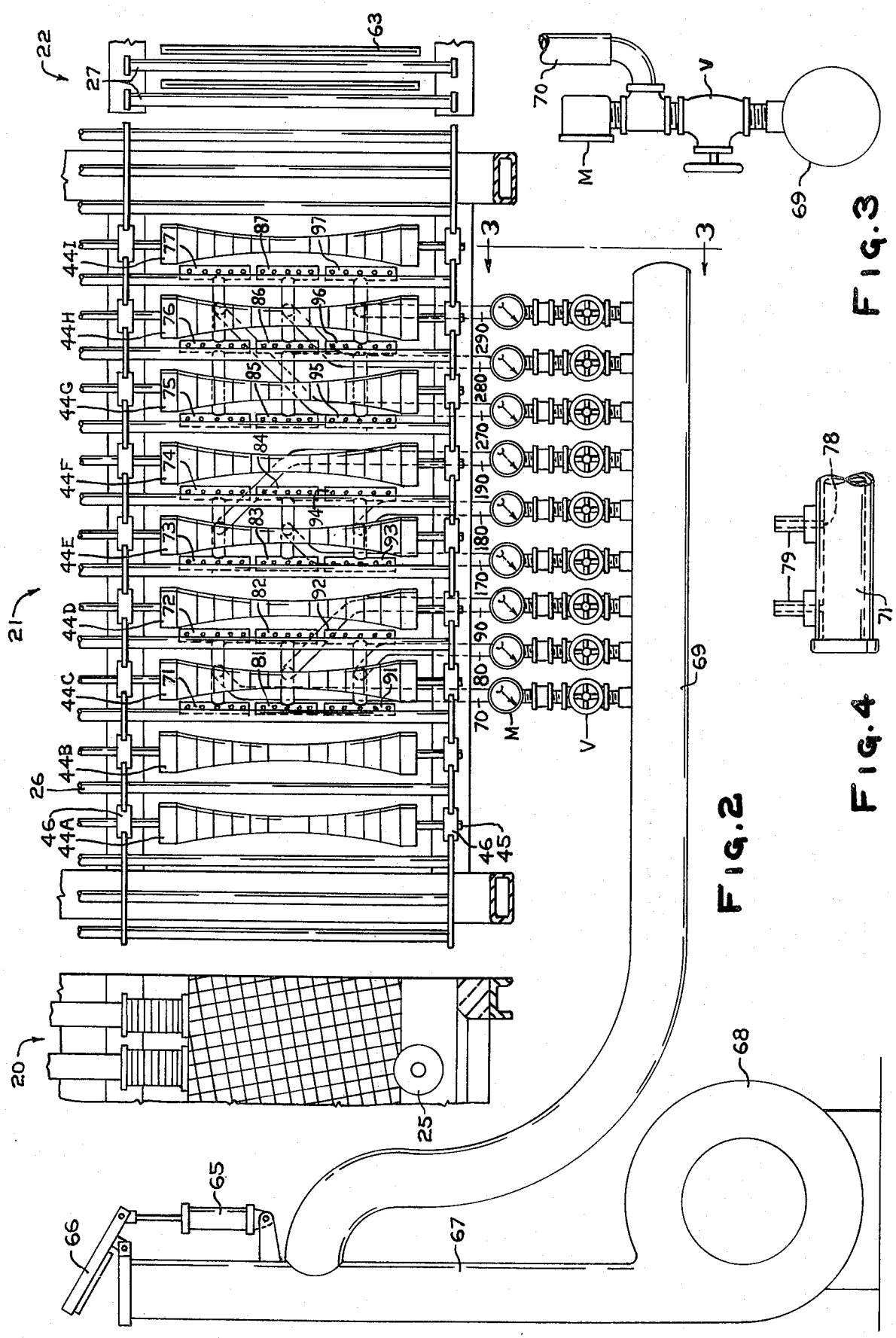

SHAPING GLASS SHEETS

BACKGROUND OF THE INVENTION

The present invention relates to shaping heat-softened sheets, and is particularly useful in improving the method and apparatus for shaping a series of glass sheets on a mass production basis by the roll forming method. Hence, while the description of an illustrative embodiment will describe the forming of shaped glass sheets, it is understood that this invention also applies to forming sheets of any heat-softenable material.

According to the roll forming method of shaping glass sheets, a series of glass sheets moves along a given conveyor path through a heating furnace to arrive at a position between upper and lower sets of rotating forming rolls at a glass shaping station. One set of forming rolls has a curvature that is complementary to the curvature of the other set of forming rolls.

When each glass sheet reaches a position between the sets of rotating forming rolls, the lower set of rotating forming rolls moves upward relative to the other set from a retracted position below said conveyor path to lift the glass sheet from the conveyor path into a sheet engaging position relative to the upper set of rotating forming rolls. The sheet moves between the rolls while engaged at both its upper and lower surfaces for a sufficient time to impress the complementary shapes of the roll sets onto the glass sheet. The sets of forming rolls are then separated and the shaped glass sheet is lowered while supported on the lower set of rotating forming rolls until it is redeposited on the conveyor path.

The rate of cooling determines whether the glass sheet is annealed, partly tempered or fully tempered.

When the next heat-softened glass sheet in the series arrives between the sets of upper and lower forming rotating rolls of the shaping station, the lower forming rolls are again moved upward toward the upper forming rolls to sheet engaging position.

The roll forming method has made it possible to shape a succession of sheets without interrupting the continuous movement of the sheets from the furnace to the cooling station. Such continuous sheet movement has resulted in increasing the rate of production of shaped glass sheets and also facilitated the shaping and tempering of thin glass sheets.

Glass sheets have been shaped and tempered while suspended from tongs. The latter tended to weaken and distort the glass at the points of tong gripping. In an effort to improve both the strength and optical properties of glass sheets, other techniques were developed to avoid the problems of tongs.

Prior to the development of the roll forming method, horizontally disposed glass sheets had been bent to shape on a mass production method by moving a series of glass sheets through a furnace and stopping the movement of each sheet in turn when the latter was aligned between a pair of shaping members. Stopping the glass sheet movement at the shaping station necessarily increased the time it took for each glass sheet to transfer from the furnace to the cooling station. Therefore, it was necessary to heat the glass before it left the furnace to temperatures sufficiently high to insure its arrival at the cooling station at a temperature sufficiently high to insure its being tempered. Such high temperature heating softened the glass surfaces sufficiently to cause the glass to stick to one of the shaping molds and to develop surface irregularities that impaired the optical properties of the shaped glass.

According to the prior art, cold air was blasted against the major surface of the glass before the latter left the shaping station, either to harden the glass sheet surface or to help separate the glass sheet from one of the shaping molds. U.S. Pat. No. 3,265,484 to Ritter, U.S. Pat. No. 3,361,552 to Ritter and U.S. Pat. No. 3,488,178 to Welker and Ritter disclose the application of cool air against one or both major surfaces of a glass sheet at a press bending station where the glass is completely stopped before the glass moves into the cooling station where a partial or complete temper is imparted. The portions of the glass resting on the glass support structure at the shaping station are obturated from the cool air so that there is non-uniform surface cooling. This can result in undesired warpage or iridescence in polarized light.

The need for curved glass sheets free of surface marking resulting from overheating the glass prior to shaping to insure that the glass sheet arrives at the cooling station at a sufficiently high temperaure to be tempered, yet without excessive heating that causes surface marking has been recognized and new methods and apparatus that do not necessarily require glass sheets to be stopped at a shaping station have been developed. Examples of such development are found in U.S. Pat. No. 3,545,951 to Nedelec and U.S. Pat. No. 3,701,644 and 3,856,499 and 3,871,855 to Robert G. Frank. The latter three patents illustrate apparatus for shaping continuously moving glass sheets by the so-called roll forming method.

The roll forming method has improved the efficiency of the fabrication of shaped glass sheets for use in automobiles, particularly in that it has avoided marks that resulted from the need to overheat glass sheets before press bending and tempering. The apparatus covered by the various Frank patents is not only capable of producing glass sheets to various complicated curved configurations at a much more rapid rate than the prior art, but also has made it possible to reduce the proportion of shaped, tempered glass sheets that are rejected for optical defects due to initial overheating. Since each glass sheet moves from the furnace exit to the cooling station in less time when it is shaped by roll forming than when the sheet is stopped completely for shaping, less initial heat is needed and to compensate for the cooling that takes place in the glass between the furnace and the cooling station.

The roll forming apparatus of the type depicted in the Frank patents is especially adapted to produce a large number of identical parts on a mass production basis without requiring any loss of time to shut down equipment during a run. It has been noted, however, that as higher production rates were attained, that various defects began to develop in the shaped glass sheets that were produced, even when the glass sheets were not overheated initially as evidenced by good optical properties of and conformance to desired shape of glass sheets early in the production runs of given patterns. The present invention provides means for reducing the occurrence of these defects as high speed production runs continue.

In roll forming non-rectangular glass sheets, particularly those having an extremity of reduced width along one longitudinal side edge of the glass that forms an acute angle that merges into either a point or a truncated extremity, it is extremely difficult to control the shape of the glass in the pointed or truncated extremity over a sustained period of time even though the glass sheets develop a shape that conforms with specifications during the early stages of a production run. This problem becomes magnified when one attempts to use roll forming apparatus at higher production rates than those for which the apparatus was originally designed.

SUMMARY OF THE INVENTION

It is understood that the present invention is suitable to shape deformable sheets of any composition. However, it will be described in terms of shaping glass sheets by the roll forming method because it has special value in the shaping of glass sheets and because the optical properties as well as the shape of shaped glass sheets are very critical.

The present invention makes it possible to reduce both the severity and the frequency of deviation from curvature of shaped sheets produced by the roll forming process. According to the present invention, the lower surfaces of the moving sheets and the lower forming rolls of roll forming apparatus which engage the lower surfaces are exposed to cooling medium in the form of mild air or gas blasts in the vicinity of the lower forming rolls. This application of cooling medium cools the moving lower sheet surface superficially and retards the rate of heating of the lower rotating forming rolls that contact the under surface of each sheet to lift it from the conveyor rolls of roll forming apparatus into engagement with the upper rotating forming rolls, to maintain the sheet in engagement and to lower it onto said conveyor rolls.

Since the roll forming process causes the lower forming rolls to contact the heated glass for a greater length of time than the upper rotating forming rolls, the surfaces of the lower forming rolls would become hotter than those of the upper forming rolls in the absence of this mild cooling.

According to the present invention, cooling medium is applied in the vicinity of the lower forming rolls toward the moving lower surfaces of the sheets to cool the latter superficially from leading edge to trailing edge and to have a greater cooling effect on the lower forming rolls than on the upper forming rolls. This reduces the temperature difference that develops between the upper forming rolls and the lower forming rolls due to the difference in time that the upper forming rolls and the lower forming rolls contact the glass sheets moving through the shaping station at a deformation temperature.

The superficial cooling of the lower glass surface of the sheet from leading edge to trailing edge increases the resistance of the lower surface to deformation without lowering the overall temperature of the sheet unduly. Exposing the lower forming rolls to the cool air blasts and the superficially cooled lower sheet surfaces reduces the rate at which the lower forming rolls are heated as the roll forming apparatus continues in operation. Therefore, as a high speed mass production continues, the shape of the sheets and the temper imparted to the shaped sheets remain more uniform over a longer period of time than apparatus not provided with the present invention. Hence, roll forming apparatus that is initially adjusted properly to provide a desired shape continues to operate properly and does not have the shaped sheets produced thereby become shaped to configurations that depart more from the desired shape as production continues.

According to another aspect of the present invention involving the treatment of non-rectangularly shaped glass sheets, cooling medium is applied at different rates toward the vicinity of the different portions of the rotating forming rolls. A greater rate of cooling medium is applied in the vicinity of a portion of the forming rolls transverse to the path of sheet travel through the sheet shaping station that engages a relatively long dimension of the glass sheets in the direction of movement through the shaping station and cooling medium is applied at a lesser rate in the vicinity of a portion of the forming rolls in a direction transverse to the path that contacts a relatively short dimension of the glass sheets in the direction of movement through the shaping station.

Apparatus for performing the method of this invention comprises means for supplying cooling medium to different portions of the shaping station and means for controlling the rate of application for the cooling medium to the different cooling medium supply means so as to provide a pattern of cooling that substantially compensates for the amount of heating that the surfaces of the forming rolls receive gradually due to their intermittent contact with successive sheets during a non-stop campaign of roll forming. The cooling pattern may be non-uniform when the sheets treated are of non-rectangular outline.

In preferred embodiments of apparatus conforming to the present invention, the cooling medium supply means is located below the lower forming rolls and is constructed and arranged to supply cooling medium upward in the vicinity of the lower forming rolls either continuously or intermittently. The cooling medium dissipates in an upward direction, but as some cooling effect on the surfaces of the upper rotating forming rolls. The cooling medium also cools the lower surface of the sheets superficially by a combination of direct contact and indirectly by controlling the temperature of the forming rolls.

If desired, additional means to supply cooling medium may be provided to supply additional cooling medium in the vicinity of the upper rotating forming rolls. In such a case, the rate of supplying cooling medium in the vicinity of the upper forming rolls is less than that supplied in the vicinity of the lower forming rolls.

BRIEF DESCRIPTION OF THE DRAWINGS

In the drawings which form part of the description of the illustrative embodiment and wherein like reference numbers refer to like structural elements.

FIG. 2 is a fragmentary, plan view of the lower portion of roll forming apparatus modified according to one embodiment of the present invention;

FIG. 3 is an enlarged end view taken along the lines 3—3 of FIG. 2; and

FIG. 4 is an enlarged, fragmentary view of a portion of one of the pipes for supplying cooling medium in accordance with the principles of the present invention.

DESCRIPTION OF THE PREFERRED EMBODIMENT

Figure 1:
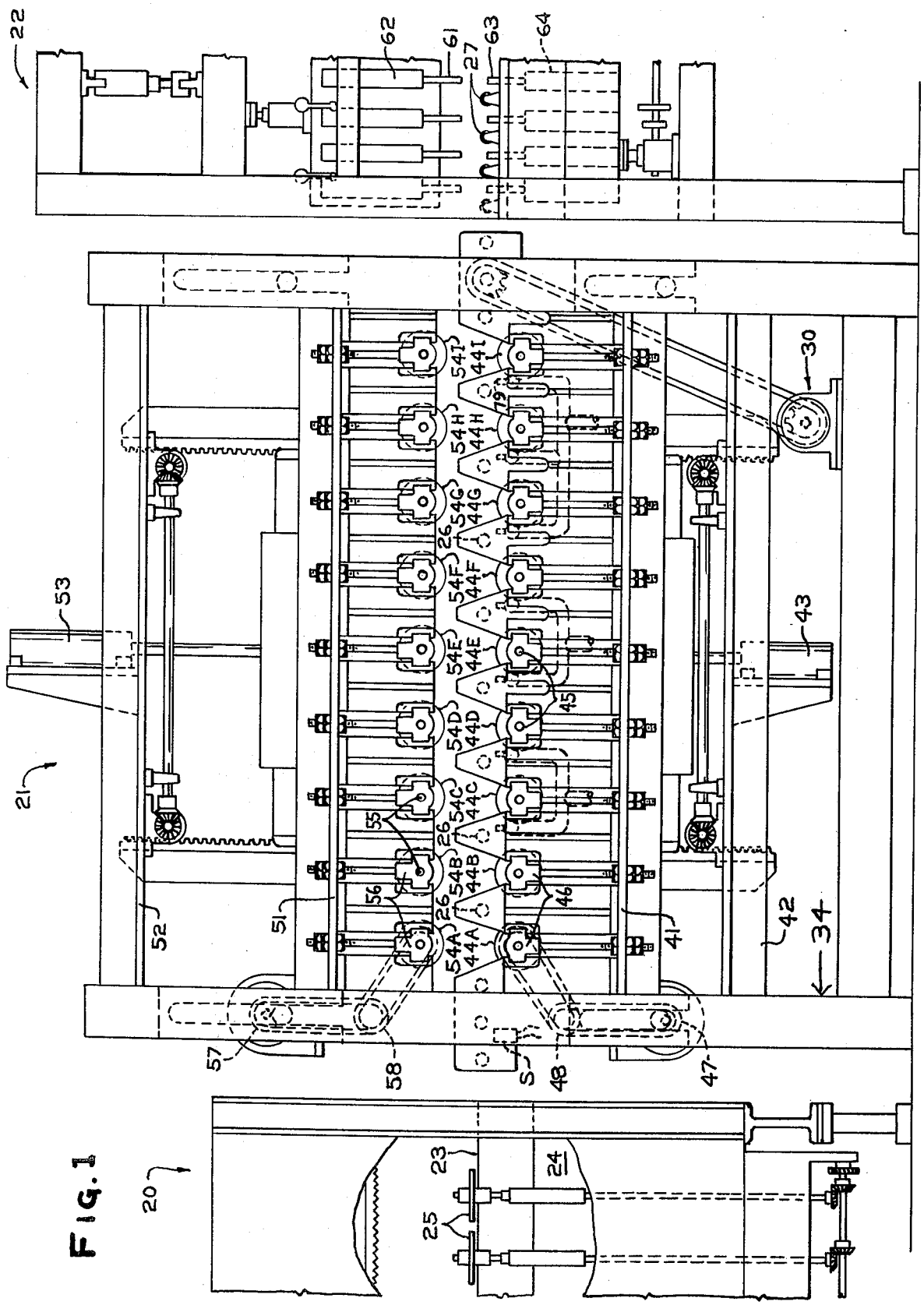
FIG. 1 is a fragmentary, longitudinal, elevaional view of a portion of roll forming apparatus for shaping glass sheets as the the latter move therethrough continuously.

Referring to the drawings, FIG. 1 discloses a side view of an important part of roll forming apparatus modified according to the present invention. Generally, the apparatus is similar to that disclosed in FIG. 21 of U.S. Pat. No. 3,701,644 to Robert G. Frank.

The roll forming apparatus comprises a heating furnace 20 of the gas hearth type, a roll forming station 21 and a cooling station 22, all of which are depicted in detail in the aforesaid Frank patent. A conveyor system defines a path along which a series of glass sheets are conveyed through the tunnel 20, the shaping station 21 and the cooling station 22.

The illustrative embodiment of the present invention shows a heated furnace of the gas hearth type whose principles of operation are depicted in U.S. Pat. No. 3,233,501 to James C. Fredley and George E. Sleighter, assigned to PPG Industries, Inc., and in U.S. Pat. Nos. 3,332,759; 3,332,760 or 3,455,669 to Harold E. McMaster et al. The conveyor for the furnace may be of the type containing glass engaging members that move the glass sheets through the hot furnace by edge contact only as depicted, or of the roller hearth type such as depicted in U.S. Pat. No. 3,245,772 to James H. Cypher and Charles R. Davidson, Jr., assigned to PPG Industries, Inc. where glass sheets are conveyed in succession over a series of longitudinally spaced conveyor rolls, which are rotated in unison about axes extending transverse to the furnace and spaced longitudinally therealong to propel a succession of glass sheets through a path extending through the length of a heated tunnel-like furnace.

In the gaseous hearth system of the preferred embodiment of the present invention, the furnace 20 is provided with a flat bed 23 formed from a series of gas supply openings arranged geometrically like a mosaic, each surrounded by a series of gas exhausting openings in close juxtaposition to each other. Each opening has an upper end which lies in a common plane with the upper ends of the other openings so as to form a flat common plane obliquely arranged at a small angle (preferably approximately 5° to the horizontal) transversely of the lengthwise dimension of the bed and the furnace. The bed extends throughout the length of the furnace. A plenum chamber 24 disposed beneath the bed supplies hot gas to the gas supply openings so that the hot gas supplied forms a blanket at the upper surface of the bed 23 to float sheets that are heated while conveyed through the furnace. The furnace also comprises a series of driving discs 25 which rotate about axes normal to the oblique surface of the bed and drivingly engage the lower edges of glass sheets to float the latter through the furnace 20 and into the shaping station 21 of the roll forming apparatus. The rotating driving discs 25 are disposed in a series along the lower side edge of the gas hearth bed slightly above the upper surface 23 of the bed, and rotate in unison to propel a series of glass sheets along the length of the gas hearth bed toward the shaping station 21.

Slightly beyond the exit of the furnace in a glass sensing device S. It is used to detect the presence or absence of a glass sheet moving thereover to initiate the operation of a conventional timing device which operates a series of adjustable timer circuits to control the operation of various moving elements in the shaping station. Since the details of these circuits do not form part of the present invention and the parts themselves are readily available, no further discussion is needed.

The shaping station 21 includes a series of rotatable conveyor rolls 26, each longitudinally extending across the width of the shaping station and longitudinally spaced one from another therelong. The rolls are disposed to have an upper common tangential plane forming an extension of the oblique plane of support provided by the gas hearth bed formed by the gas supplied through the array of gas supply openings in the furnace 20.

The roll forming station 21 of the present invention comprises an open reinforced frame structure 34 to which are movably supported a lower forming roll housing 41 (supported for vertical movement relative to a lower support 42 by a lower piston 43) and an upper forming roll housing 51 (supported for vertical movement relative to an upper support 52 by an upper piston 53). The lower forming roll housing 41 supports a series of segmented forming rolls 44A through 44I mounted on shafts 45, while the upper forming roll housing 51 supports a series of upper segmented forming rolls 54A through 54I mounted on shafts 55. Means is provided to adjust the vertical position of vertically adjustable brackets 46 and 56 (which receive the opposite end portions of respective shafts 45 and 55) relative to the housings 41 and 51, respectively.

Both the upper and lower sets of forming rolls are segmented and separated by low friction separating means to allow adjacent segments to rotate at different rotational speeds to minimize marks on the glass sheet surfaces. Corresponding segments of each set of forming rolls are keyed to the shafts on which they are mounted while other segments are free running.

The lower forming rolls 44A through 44I are shaped to provide a concavely shaped outer surface along its corresponding axis of rotation. The corresponding upper forming rolls 54A through 54I are provided with shapes complementary to those of the corresponding lower forming rolls so that each upper forming roll as an outer configuration that is convex along its axis of rotation.

The conveyor rolls 26 are driven in unison through a driving means 30 connected through conventional chain drives and sprockets to a conveyor driving mechanism in a manner well known in the art and which is described in further detail in the aforesaid Frank patent. In addition, lower forming roll driving means 47 is supported on the frame structure 34 and is coupled to sprockets (not shown) on lower shafts 45 through flexible coupling means 48 for driving at least one segment of each of the lower forming rolls 44 in unison at a predetermined adjustable, rotatable speed, and upper forming roll driving means 57 is also supported on the frame structure 34 and is coupled to sprockets on upper shafts 55 through flexible coupling means 58 for driving at least one segment of each of the upper forming rolls 54 at an adjustable rotatable speed independent of the speed of rotation of the driven segments of the lower forming rolls.

The upper piston 53 moves the upper forming rolls 54 vertically relative to the upper support 52 and the lower piston 43 moves the lower forming rolls 44 vertically with respect to the lower support 42 according to a predetermined sequence. The details of the construction of the forming rolls and their method of actuation is obtainable from the description in U.S. Pat. No.

3,701,644 to Robert G. Frank, the disclosure of which is incorporated herein by reference.

The cooling station 22 comprises a series of conveyor rolls 27 adjustable in shape about their periphery to conform to the shape of the sheets entering the cooling station. U.S. Pat. No. 3,807,546 to Rudy Canonaco and U.S. Pat. No. 3,807,982 to George R. Claassen et al disclose in detail the construction and operation of adjustable shaping rolls of the type found suitable for use in glass sheet cooling stations of glass tempering apparatus. The cooling station 22 also comprises an upper set of nozzles 61 of the elongated slot type extending from upper plenum chambers 62 and a lower set of nozzles 63 extending upwardly from lower plenum chambers 64. The nozzles are spaced from one another longitudinally of the conveyor path through the cooling station and the elongated slots each extend across the width of the conveyor path as is well known in the art.

In a typical operation, a series of glass sheets is conveyed through the heating furnace 20 where each sheet in turn is heated to deformation temperature and conveyed from the bed 23 into the shaping station 21. The leading sheet in the series is conveyed along the successive conveyor rolls 26 until the lower forming rolls 44, which are disposed in vertical planes between adjacent conveyor rolls 26, are lifted upward in unison to enable at least some of the lower forming rolls to lift the heat-softened glass sheet into engagement between at least some of the lower forming rolls 44 and some of the upper forming rolls 54. The corresponding keyed segments of the lower forming rolls 44 and of the upper forming rolls 54 are rotated at such speeds as to minimize any surface damage to the engaged glass sheet surfaces as the glass sheet continues through the shaping station 21 enroute to the cooling station 22. Each glass sheet in turn is engaged for sufficient time to have a desired shape impressed thereon as it passes between the rotating forming rolls. The lower forming rolls 44, while still rotating, are retracted to their retracted position below the plane of support provided by the upper common tangential plane of the conveyor rolls 26.

What has been described represents typical roll forming apparatus of the prior art and its method of operation. In the prior art, the composition of the forming roll segments had been selected with care to insure proper operation of the roll forming apparatus with minimum glass breakage and minimum glass marking. The material with which the forming rolls are made have a low thermal conductivity to minimize thermal shock on the hot glass when the glass engages the relatively cold forming rolls. The forming rolls are composed of a material having a low coefficient of thermal expansion over a wide temperature range of approximately 600° F. (333° C.) from room temperature to an elevated temperature that the forming rolls attain on contacting the hot glass to avoid thermal distortion of the forming rolls. The composition of the forming rolls is such that the roll segments do not react chemically with the glass at the temperature range experienced during the roll forming operation. The roll segments are of a composition that is durable over a wide temperature range between the glass temperature and the ambient temperature at the shaping station of roll forming apparatus. The material of which the forming roll segments are composed is readily shaped or machined to a complex contour desired to be imparted to the glass. With the criteria in mind, the best material for forming roll segments known to date is an asbestos cement sold by Johns-Manville under the trademark of TRANSITE.

The use of the best known materials for the forming roll segments made it a relatively simple matter to set up roll forming apparatus to produce patterns that had been produced in the past and obtain acceptable products with a minimum of trouble. However, the roll forming apparatus, particularly when used at high rates of production, greater than those previously used over an extended run, began to produce waviness in the glass surface and gradual increases in departures from desired tolerances of certain patterns set by the customer, particularly, non-rectangular sheets having a pointed or truncated corner forming a small acute angle. The present invention was designed to overcome these problems.

According to an illustrative embodiment of the present invention, a series of apertured pipes is provided at the glass shaping station in position to supply cooling medium in the vicinity of certain adjacent lower forming rolls. In a preferred apparatus embodiment, the apertured pipes are located below the position occupied by the lower forming rolls in their retracted position depicted in FIG. 1 and the pipes are provided with nozzles to direct upward flows of cooling medium in the vicinity of the lower forming rolls.

The pipes are divided into pipe sections, each having relatively short lengths as desired. In the illustrative embodiment of the present invention, each pipe comprises three longitudinally aligned pipe sections, for example, sections 71, 81, and 91 disposed in the spaced below and between adjacent forming rolls 44B and 44C, sections 72, 82, 92 in the next space below and between the next pair of adjacent lower forming rolls 44C and 44D and pipe sections 73, 83, 93 in the space below and between lower forming rolls 44D and 44E followed by pipe sections 74, 84, 94, in the space below and between lower forming rolls 44E and 44F etc. until pipe sections 77, 87 and 97 ae disposed in the space below and between the adjacent lower forming rolls 44H and 44I.

A main feed pipe 69 supplies air under pressure through a set of headers 70, 80, 90, 170, 180, 190, 270, 280, and 290 to aligned pipe sections in different portions of the shaping stations as follows:

Branch feed pipe 70 supplies air under pressure to apertured pipe sections 71 and 72, branch feed pipe 80 supplies air under pressure to apertured pipe sections 81 and 82, branch feed pipe 90 supplies air under pressure to apertured pipe sections 91 and 92. Further along the shaping staion 21, branch feed pipe 170 supplies ar to apertured pipe sections 73 and 74, branch feed pipe 180 supplies air to apertured pipe sections 83 and 84, and branch feed pipe 190 supplies air to apertured pipe sections 93 and 94. Still further downstream, branch feed pipe 270 furnishes air to apertured pipe sections 75, 76 and 77, while ranch feed pipe 280 furnishes air to apertured pipe sections 85, 86 and 87, and branch feed pipe 290 supplied air under pressure to apertured pipe sections 95, 96 and 97.

Each branch feed pipe has a separate valve V to adjust the rate of air flow to the apertured pipe sections controlled by the respective branch feed pipe. A manometer M is coupled to each of the branch feed pipes to monitor the pressure at which air is supplied to the associated apertured pipe sections.

Apertured pipe sections 71 through 77 are aligned to one side of the shaping station in a direction generally parallel to the paths taken by one longitudinal side portion of the sheets being processed to face said one longitudinal side portion of each sheet (the shorter side), apertured pipe sections 81 through 87 are aligned through the center of the shaping station parallel to the line of pipe sections 71 through 77 to face the longitudinally extending center portion of each sheet, and pipe sections 91 through 97 are aligned on the opposite side of pipe sections 81 through 87 to face the other longitudinal side portion of each sheet (the longer side). The amount of air supplied per unit time through each of the branch feed pipes may be controlled in such a manner as to control the rate of cooling the different portions of the atmosphere adjacent different axial portions of each of the lower forming rolls 44 adjacent thereto.

The main feed pipe 69 is in communication with a blower 68. The blower communicates through a vented pipe 67 having a pivotal closure member 66 at its upper end, the opening and closing of the pivotal closure member 66 being controlled by a piston 65. The latter is controlled from a solenoid valve system (not shown), which is actuated and deactivated by the timer circuit that controls the movement of the forming rolls at the shaping station. The blower blows continuously, but it is only when the closure member 66 is closed that pressure is supplied through the main feed pipe 69 and the branch feed pipes to the associated pipe sections. Operation of the opening and closing of the closure member 66 is synchronized with the lifting and lowering of the lower forming rolls 44 whenever intermittent cooling is desired. Furthermore, it is possible to maintain the closure member 66 permanently in the closed position so that air under pressure is fed continuously to all the pipe sections at all times, if such is desirable.

An enlarged fragmentary view of a single pipe 71 is shown in FIG. 4. Each pipe section 71 is provided with axially aligned apertures 78 supporting elongated nozzles 79 which are directed vertically so that air supplied to each pipe section passes through the vertically extending nozzles 79 to provide verticaly directed streams of air in the vicinity of the lower forming rolls 44, thus providing means for cooling the lower forming rolls and/or the lower surfaces of the moving sheets passing through the shaping station at any desired rate. It is also noted that different forming rolls can be cooled at different rates and different sections or regions of rolls can be cooled at different rates as desired depending upon the rate of heating experienced during a high speed mass production operation.

The whole assembly of pipe sections and the branch feed pipes is supported in fixed spaced relation to the lower support 42, which also supports the lower piston 43 that actuates movement of the lower forming roll housing 41. In this manner the effect of the air blasts blowing upward has a relatively large effect of moderating the heating of the lower rotating forming rolls 44 and by virtue of the additional distance to the upper rotating forming rolls 54, has a very moderate effect on said upper forming rolls in the spaces between adjacent sheets, if the air is supplied continuously. It is also within the intended scope of the present invention to support the array of apertured pipe sections on the vertically movable lower forming roll housing 41 so as to maintain a fixed distance between the nozzles 79 of the apertured pipe sections and the lower forming rolls 44 throughout the roll forming cycle. However, from past experience, it is sufficient to have the apertured pipe sections rigidly supported on the fixed lower support 42. Under these circumstances, the lower piston 43 need lift only the lower forming roll housing 41 and is not required to lift or lower the apertured pipe sections and the branch feed pipes which would add to the load on the piston.

While the embodiment described and illustrated shows an array of pipes below the lower forming rolls, it is understood that the roll forming apparatus is so constructed that it is possible to provide another array of apertured pipes carried by either the upper support 52 or by the upper forming roll housing 51 and having nozzles extending downward. In such a case, air is supplied at a greater rate to the lower array of apertured pipes than to the upper array to provide a greater moderating effect to the heating of the lower forming rolls 44 than to the upper forming rolls 54. The need for cooling the upper forming rolls depends on the rate of production and the sheet size which determine the time gap between succesive engagements of sheets being processed.

In a practical embodiment of this invention that has been used successfully in commercial production, the blower 68 provided a pressure of 24 ounces per square inch (12 millimeter column of mercury), a volume of 1360 standard cubic feet per minute (6.4 cubic meters/second) with a 15 horsepower rating and rotated at 3450 revolutions per minute. The manometers M were provided with a pressure gauge of 0 to 20 ounces per square inch, the branch feed pipes were rubber hoses having an inner diameter of 1 inch (25.4 millimeters) an outer diameter of 1 13/32 inch (36 millimeters) and were covered with a fiber glass sleeve 0.035 inch (0.9 millimeter) thick and 1 ½ inch (38.1 millimeter) inside diameter. The pipe sections were one inch diameter pipes having 3/16 inch (4.6 millimeter) diameter nozzles extending upward for a length of one inch (25.4 millimeters) and spaced apart along the axial length of the pipe section at 1 ½ inch (38.1 millimeter) center to center.

The apparatus was operated so that air was supplied intermittently, the closure member 66 closing at the same time that the lower piston 43 started to lift the lower forming rolls 44 and the closure member 66 was opened at the control of the timer after the shaped glass sheet left the shaping station. The following chart illustrates a typical operation where glass sheets had their longest longitudinal dimension along the lower side against the driving discs in the furnace and their shortest longitudinal dimension at their upper edges.

| PRESSURE APPLIED TO APERTURED PIPE SECTIONS | |
| --- | --- |
| Sections | Pressure (Ounces/Sq. In) |
| 71 to 77 | 2 |
| 81 to 87 | 4 |
| 91 to 97 | 6 |

Glass sheets of non-rectangular shape having a nominal thickness of 5/32 inch (4 millimeters) about 18 inches (483 millimeters) wide and 41 inches (1041 millimeters) long at their longer side and tapering at one end at approximately 45° angle to a shorter length of about 30 inches (762 millimeters), were shaped to a radius of 50 inches at the rate of about 525 per hour with no loss due to departure from required shape using the intermittent air. Before the apertured pipe sections were used, it was difficult to maintain the glass sheet shape, particularly at the trailing edge.

The form of the invention shown and described in this disclosure represents an illustrative preferred embodiment and certain modifications thereof. It is understood that the mild application of cooling medium to the lower surface of moving glass sheets rather than to glass sheets while the latter are stopped at a shaping station enables the entire lower surface to be hardened superficially without any marked local variation in superficial cooling. It is also understood that the mild application of cooling medium in the vicinity of the lower forming rolls results in a reduced temperature difference between the surfaces of the upper forming rolls and those of the lower forming rolls resulting from intermittent contact with hot sheets for different portions of the roll forming cycle. It is understood that various changes may be made such as applying the cooling medium non-uniformly along th length of the shaping station instead of or in addition to the non-uniform application across the width of said shaping station or changing the pattern with time as the roll forming campaign to produce a particular pattern continues without stopping the operation of the roll forming apparatus without departing from the gist of the invention as defined in the claimed subject matter that follows.

We claim:

1. In the roll forming method of shaping heatsoftened sheets by a mass production method comprising
    moving a series of flat sheets along a path defined by a conveyor,
    heating each sheet in said series to its deformation temperature,
    conveying each moving sheet of said series along said path through a shaping station comprising upper and lower rotating forming rolls of complementary curvature while said sheet is at its deformation temperature,
    lifting said moving sheet on at least some of said lower rotating forming rolls off said path and into engagement with at least some of said upper rotating forming rolls,
    engaging said moving sheet between said rotating forming rolls for sufficient time to impress a shape into said deformable sheet and then
    lowering said moving sheet on at least some of said lower rotating forming rolls to redeposit said shaped sheet on said path before said sheet moves beyond said shaping station,
    and repeating said steps of lifting, engaging and lowering for each sheet in said series that is conveyed through said shaping station,
    the improvement comprising applying a cooling medium within said shaping station toward the lower surfaces of said moving glass sheets while the latter move between said upper and lower forming rolls while being conveyed along said lower forming rolls in an amount sufficient to superfically cool said lower surfaces of said glass sheets and to reduce a temperature difference that would develop between the upper forming rolls and the lower forming rolls in the absence of said application of cooling medium due to the difference in time that said upper forming rolls and said lower forming rolls contact said moving sheets while the latter are at their deformation temperature.

2. The improvement as in claim 1, wherein said cooling medium is applied toward the vicinity of said upper forming rolls to a lesser degree than toward the vicinity of said lower forming rolls.

3. The improvement as in claim 1, wherein said sheets are nonrectangular in outline and have a relatively long dimension in the direction of movement through said shaping station in one region thereof and a relatively short dimension in the direction of movement through said shaping station in another region thereof, further comprising applying said cooling medium nonuniformly in the vicinity of different portions of said lower forming rolls in a direction transverse to said path.

4. The improvement as in claim 1, further comprising applying said cooling medium non-uniformly along the length of said portion of said path traversing said shaping station.

5. The improvement as in claim 1, further comprising applying more cooling medium to the vininity of a portion of said lower forming rolls that are in contact with a relatively long longitudinally extending portion of said sheets and less cooling medium to the vicinity of another portion of said lower forming rolls that are in contact with a relatively short longitudinally extending portion of said sheets.

6. The improvement as in claim 1, wherein said cooling medium is applied in a non-uniform pattern to different portions of said shaping station.

7. The improvement as in claim 6, wherein said pattern of cooling medium is changed from time to time without stopping said mass production method.

8. In an apparatus for shaping a series of glass sheets by the roll forming method in a mass production operation comprising a heating furnace for heating glass sheets to their softening temperature and having means to convey the sheets of glass therethrough along a generally horizontal path; a roll forming station having opposed upper forming rolls and lower forming rolls of complementary curvature, conveyor rolls located in spaces between said lower conveyor rolls defining a horizontal path of glass movement and aligned to receive heat-softened glass leaving said heating furnace, and means for periodically bringing said upper and lower forming rolls together so as to bend successive sheets of heat-softened glass as they are being conveyed therebetween, whereby each sheet of heat-softened glass rests on a portion of said lower forming rolls for a period of time greater than the period of engagement with said upper forming rolls, thereby creating an unbalanced, detrimental accumulation of heat in at least some of the lower forming rolls; and a quenching station including conveyor means for receiving bent sheets of glass from said forming station and transporting them aong a horizontal path through the quenching station, and cooling means in the quenching station above and below said path for rapidly cooling the glass sheets; the improvement comprising:
    means in said forming station for circulating a gaseous cooling medium more vigorously in regions adjacent to a plurality of said lower forming rolls and beneath the path of movement and lower surfaces of heat-softened glass sheets moving through the forming station, than in regions adjacent to said upper forming rolls and above the path of movement and upper surfaces of heat-softened glass sheets moving through the forming station; said means including a plurality of gas nozzles disposed between at least one pair of adjacent lower forming rolls and positioned so as to deliver a gaseous cooling medium upwardly toward the path of heat-softened glass movement through the forming station and to provide a cooling gas circulation in the region of the lower forming rolls and the lower surfaces of the heat-softened glass sheet moving through the forming station, whereby the accumulaion of heat in the lower forming rolls is substantially offset.

9. The glass shaping apparatus of claim 8 wherein said means for inducing cooling circulation are located only in the vicinity of the lower forming rolls.

10. The glass shaping apparatus of claim 8 wherein said nozzles are arranged in a plurality of independently controllable groups, said groups lying in rows extending transversely to the direction of glass travel on said lower forming rolls, each of said groups communicating with said source of pressurized gas by means of a separate valved pipe.

* * * * *

UNITED STATES PATENT AND TRADEMARK OFFICE
CERTIFICATE OF CORRECTION

PATENT NO. : 3,992,181
DATED : November 16, 1976
INVENTOR(S) : Robert G. Frank

It is certified that error appears in the above-identified patent and that said Letters Patent are hereby corrected as shown below:

In the Abstract, please cancel the second paragraph.

Column 2, line 47, after "needed", delete "and".

Column 3, line 36, "wpuld" should be --would--.

Column 3, line 67, after "more", insert --and more--.

Column 4, line 20, after "application", delete "for" and insert --of--.

Column 4, line 55, "elevaional" should be --elevational--.

Column 4, line 57, after "as", delete "the" (first occurrence).

Column 6, line 6, "therelong" should be --therealong--.

Column 7, line 68, "the" (second occurrence) should be --these--.

Column 8, line 32, "spaced" should be --space--.

Column 8, line 40, "ae" should be --are--.

Column 8, line 46, "stations" should be --station--.

Column 8, line 53, "staion" should be --station--.

Column 8, line 54, "ar" should be --air--.

UNITED STATES PATENT AND TRADEMARK OFFICE
CERTIFICATE OF CORRECTION

PATENT NO. : 3,992,181
DATED : November 16, 1976
INVENTOR(S) : Robert G. Frank

It is certified that error appears in the above—identified patent and that said Letters Patent are hereby corrected as shown below:

Column 9, line 43, "verticaly" should be --vertically--.

Column 11, line 23, "th" should be --the--.

Column 11, Claim 1, line 1, "heatsoftened" should be --heat-softened--.

Column 12, Claim 8, line 58, "aong" should be --along--.

Column 13, Claim 8, lines 11 and 12, "accumulaion" should be --accumulation--.

Signed and Sealed this

First Day of March 1977

[SEAL]

Attest:

RUTH C. MASON
Attesting Officer

C. MARSHALL DANN
Commissioner of Patents and Trademarks